Nov. 18, 1941.                E. W. THIELE                2,263,056
                       CONVERSION OF HYDROCARBONS
                           Filed Jan. 28, 1938
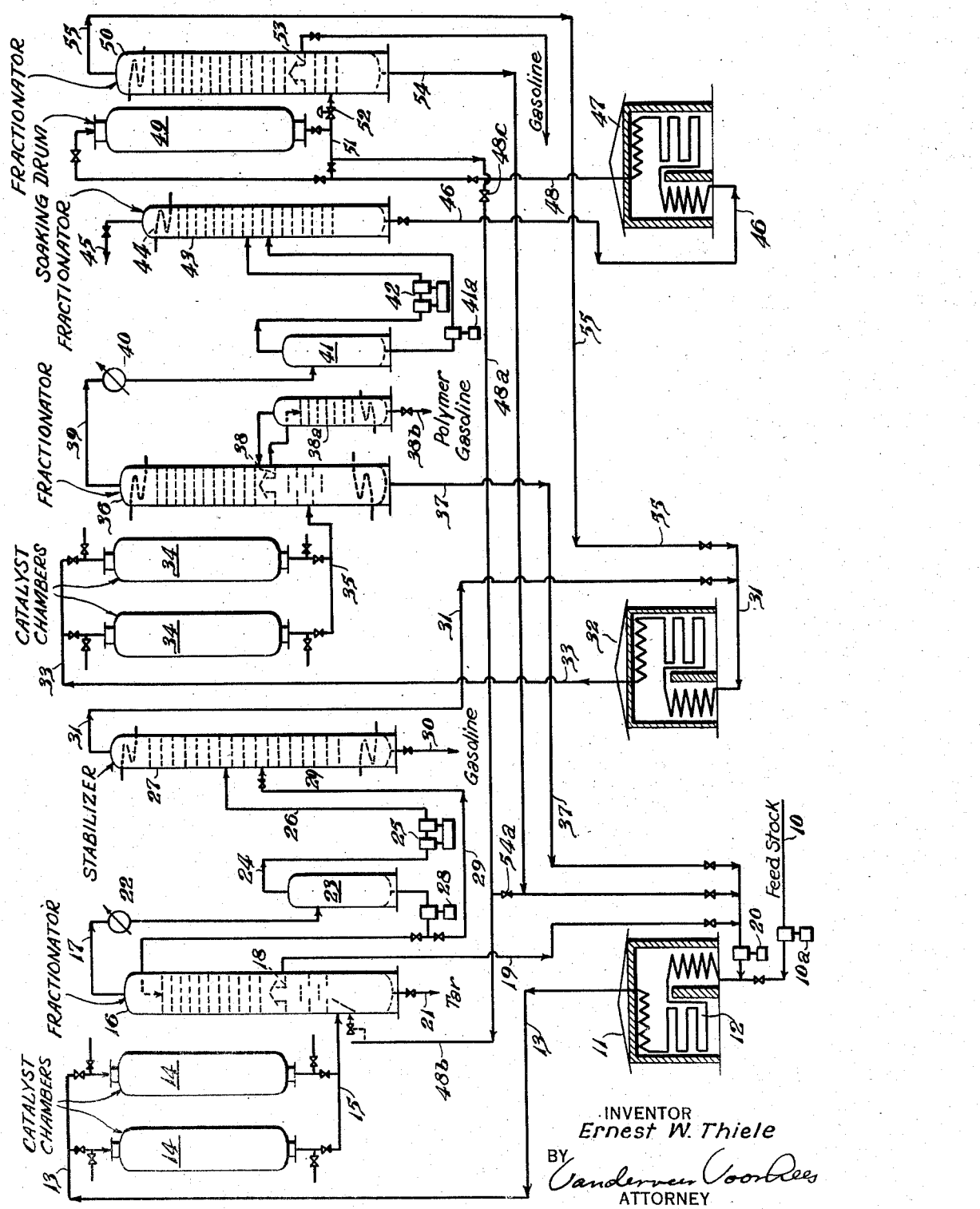
INVENTOR
Ernest W. Thiele
BY
ATTORNEY Patented Nov. 18, 1941

2,263,056

UNITED STATES PATENT OFFICE 2,263,056

CONVERSION OF HYDROCARBONS

Ernest W. Thiele, Chicago, Ill., assignor to Standard Oil Company, Chicago, Ill., a corporation of Indiana Application January 28, 1938, Serial No. 187,577

4 Claims. (Cl. 196—10)

This invention relates to a process of converting hydrocarbon oils and particularly the heavy petroleum hydrocarbons into gasoline and motor fuels. The process relates particularly to the conversion of hydrocarbon oils by the action of catalysts at elevated temperatures wherein the heated oil vapors are contacted with said catalysts and subsequently separated into gasoline, gases and recycle stock.

One object of the invention is to produce a gasoline of higher antiknock value than that produced by ordinary catalytic cracking processes. Another object of the invention is to obtain a larger yield of gasoline by more completely utilizing the gases produced in the process. Still another object of the invention is to combine catalytic cracking with polymerization of the gases produced in the process in such a way as to obtain substantially complete conversion of the hydrocarbon oil into motor fuel with a small amount of tar and fixed gases, particularly hydrogen and methane. Other objects of the process will be apparent from the following description thereof.

The process is illustrated by a drawing which shows in diagrammatic form one arrangement of the apparatus suitable for carrying it out. Referring to the drawing, gas oil, heavy naphtha or other clean distillate petroleum oil is introduced by line 10 and pump 10—a to heater 11, heating coil 12 therein serving to conduct the oil through the heater to transfer line 13. In this manner the oil may be vaporized and discharged into catalyst chambers 14 at a temperature of about 800 to 1000° F. Catalyst chambers 14 are charged with a suitable cracking catalyst, preferably natural clays, acid treated clays, fuller's earth, Death Valley clay, montmorillonite, bentonite, boron silicate, wilkinite, etc., natural and artificial zeolite, aluminum silicate, bauxite, aluminum oxide promoted with nickel oxide, etc., and similar materials. The catalyst is preferably prepared in the form of small granules permitting free passage of oil vapors therethrough.

The pressure in catalyst chambers 14 is suitably near atmospheric pressure, for example 10 to 25 pounds per square inch, although somewhat higher pressures may be employed, for example 50, 100 or even 200 pounds per square inch. The cracked vapors led from chambers 14 by a line 15 pass to fractionating tower 16 where tar and recycle stock are separated and the gasoline and gases are withdrawn as a vapor by line 17. Recycle oil, for example a gas oil of 20 to 30 A. P. I. gravity, is withdrawn by trap-out 18 through line 19 and forced by pump 20 back to heater 11. Heavy products are withdrawn from the base of tower 16 and discharged from the system by valved line 21. These products which may be termed tar may have a gravity of 5 to 15 A. P. I., although if desired somewhat lighter oil may be discarded as a tar, for example oil having a gravity of 15 to 20 A. P. I.

Gasoline vapors and gases are conducted by line 17 through cooler 22 and separating drum 23 where the uncondensed gases are withdrawn by line 24 leading to compressor 25 and thence discharged by line 26 into stabilizer 27 under a pressure of about 200 to 250 pounds per square inch. Somewhat lower pressures may be employed in stabilizer 27, depending on the temperature thereof. Liquids condensed in separator 23 are forced by pump 28 and line 29 into stabilizer 27 for fractionation along with the compressed gases. In stabilizer 27 the gasoline is fractionated from propane and other hydrocarbons and gases undesired in the gasoline. The stabilized gasoline is withdrawn by line 30 leading to suitable storage or to a treating process not shown. The uncondensed gases, including substantially all of the propane and lighter gases, e. g., hydrogen, methane, ethane, ethylene and propylene and also some butane and butylenes, are withdrawn by line 31 leading to heater 32 where they are heated to a suitable temperature for polymerization of the olefins contained therein, which will ordinarily constitute about 20 to 30% of the gases or even more. From heater 32 the gases are charged at a temperature of about 250 to 600° F. by line 33 to catalyst chambers 34 which contain a suitable polymerization catalyst, for example an acid acting catalyst such as phosphoric acid deposited on silica, kieselguhr, coke or other suitable support. Other catalysts may be used, for example zinc chloride, aluminum chloride, sodium aluminum chloride, etc.

Polymerized gases from chambers 34 are led by line 35 to fractionating tower 36 where polymers heavier than gasoline produced in the catalytic polymerization chambers 34 are separated and withdrawn by line 37 and conducted back to heater 11 where they are combined with the fresh oil stream in line 10. Polymer gasoline is condensed in fractionator 36 and withdrawn from trap-out 38 to stripper 38a from which it is withdrawn by line 38b to suitable storage or for further treatment. Propane, together with some butane and other hydrocarbons lighter than desired in the gasoline are removed from tower 36 by vapor line 39 leading to cooler 40 and separator 41. Uncondensed gases are compressed under high pressure, e. g. 500 to 1000 pounds per square inch or even higher, for example 2000 pounds per square inch. From compressor 42 the gases are conducted to fractionator 43, for example under a pressure of 500 pounds. Condensed liquids in separator 41 are passed to fractionator 43 by pump 41a. A cooling coil 44 on the top of fractionator 43 is provided to condense the greater part of the hydrocarbons. Hydrogen, methane and some heavier hydrocarbons are discharged from the system by line 45. Condensed hydrocarbons are withdrawn by line 46 leading to polymer furnace 47 where the gases are heated to a high temperature, e. g. 900 to 1300° F. Under these conditions of high pressure and temperature extensive thermal decomposition of the saturated hydrocarbon gases results in polymerization to gasoline and formation of unsaturated gases. Gases leaving the polymerization furnace 47 are conducted by line 48 to soaking drum 49 and thence into fractionator 50. If desired, drum 49 may be by-passed by leading the gases through line 51 directly to the fractionator 50.

Before introducing the gases into fractionator 50 it is preferred to reduce the pressure by valve 52 so that fractionator 50 may be operated with a pressure of about 200 pounds per square inch. Gasoline which is condensed in the fractionator is withdrawn by trap-out 53 and a heavier recycle oil is withdrawn by line 54 leading to furnace 11 by pump 20 or, if desired, line 54 may be connected to fractionator 16 by valved lines 54a and 48b to permit introducing the recycle oil from fractionator 50 into fractionator 16 for further fractionation.

Instead of taking the hot products from furnace 47 or drum 49 to fractionator 50, they may be returned to fractionator 16 by way of lines 48a and 48b. In this case valve 48c will be open and fractionator 50 will not be used, the gasoline, instead of being drawn from trap-out 53, being mixed with the catalytic cracking gasoline drawn from line 30.

Gases separated from the top of fractionator 50 will contain a considerable amount of olefin hydrocarbons, for example ethylene, propylene and butylene, and therefore I prefer to conduct them by a line 55 and line 31 to polymerizing furnace 32 for repolymerization to gasoline and recycling of the unpolymerizable constituents. Gasoline which is separated by line 30, trap-outs 38 and 53 may be combined to produce a single blend characterized by a high knock rating usually within the range of 80 to 90 octane number, depending on the character of the original charging stock supplied to line 10.

Although I have described my process with respect to a specific embodiment thereof it should be understood that in the operation of my process I may employ all the methods well-known in the art, such as alternate regeneration of catalyst in catalyst chambers 14 and 34 for example, segregating each chamber when the catalyst is spent and forcing an oxygen-containing gas therethrough, preferably at a temperature below 1000° F. to remove carbonaceous deposits from the catalyst by combustion. I may also employ suitable heat exchangers for transferring heat from hot streams leaving various steps of the process into cooler streams entering the process, particularly streams entering heater 11 and catalyst chambers 34. Similarly, various arrangements of valves and pumps may be employed where necessary. My invention is not limited by the specific examples given except as described in the accompanying claims.

I claim:
1. In a process for converting heavy hydrocarbon oils into gasoline whereby the oil is vaporized and the vapors are contacted with a solid cracking catalyst at a relatively low pressure and a temperature of about 800 to 1000° F., after which the products are fractionated into unconverted heavy oil, a gasoline fraction and an olefinic fraction consisting of hydrogen, methane and hydrocarbons lighter than those desired in said gasoline fraction, the improvement comprising treating said gaseous hydrocarbons, including hydrogen and methane with a polymerization catalyst at a temperature of about 250 to 600° F., whereby unsaturated gases are polymerized into gasoline and some polymers heavier than gasoline, separating said polymer gasoline from said heavier than gasoline fraction and unpolymerized gases, compressing said unpolymerized gases to a high pressure of about 500 to 2000 pounds per square inch, fractionating said compressed gases and substantially removing hydrogen and methane therefrom, heating the remaining hydrocarbon gases without substantial reduction in pressure to a high temperature of about 900 to 1300° F. in a gas pyrolysis zone whereby the said gases are substantially converted into gaseous olefins and liquid hydrocarbons boiling within the gasoline boiling range, separating the said liquid hydrocarbons boiling within the gasoline boiling range and recycling the said gaseous olefins back to said catalytic gas polymerization step.

2. The process of claim 1 wherein hydrocarbons higher boiling than gasoline produced in said catalytic polymerization step are separated and recycled to said cracking catalyst contact step first mentioned.

3. The process of claim 1 wherein hydrocarbons higher boiling than gasoline produced in said gas pyrolysis step are separated and recycled to said cracking catalyst contacting step first mentioned.

4. The process of claim 1 wherein hydrocarbons higher boiling than gasoline produced in said catalytic polymerization step and in said gas pyrolysis step are separated and recycled to said cracking catalyst contacting step first mentioned.

ERNEST W. THIELE.